July 18, 1933.                    P. H. CRAGO                    1,918,834

VOLTAGE INDICATING APPARATUS

Filed March 29, 1932

INVENTOR
Paul H. Crago.
BY
HIS ATTORNEY

Patented July 18, 1933

1,918,834

UNITED STATES PATENT OFFICE

PAUL H. CRAGO, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

VOLTAGE INDICATING APPARATUS

Application filed March 29, 1932. Serial No. 601,875.

My invention relates to voltage indicating apparatus, and has for an object the provision of novel and improved apparatus of this type dependent for its operation on the fact that certain types of glow lamps are characterized by a fixed break-down voltage below which the lamp is dark, and above which it glows.

I will describe three forms of apparatus embodying my invention, and will then point out the novel features thereof in claim.

Figure 1:
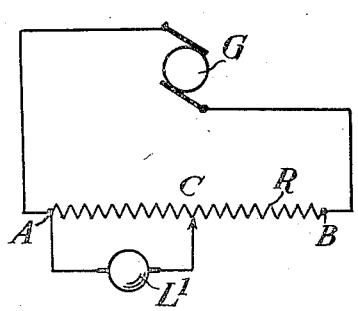
Figure 2:
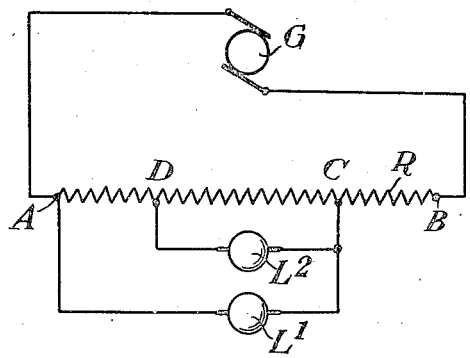
Figure 3:
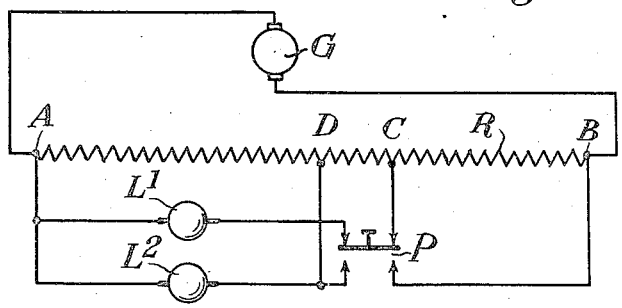
Figure 4:
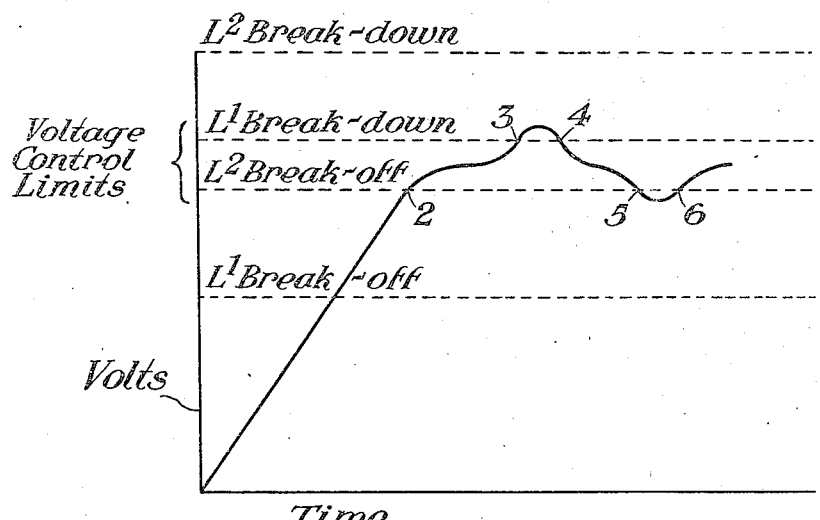

In the accompanying drawing, Fig. 1 is a diagrammatic view showing one form of voltage measuring apparatus embodying my invention. Fig. 2 is a diagrammatic view showing voltage limit indicating apparatus also embodying my invention. Fig. 3 is a view showing a modification of the apparatus shown in Fig. 2 and also embodying my invention. Fig. 4 is a curve illustrating the characteristics of the apparatus shown in Fig. 3.

Similar reference characters refer to similar parts in each of the views.

Referring first to Fig. 1, the reference character G designates a source of current, which, as here shown, is alternating current, but which may equally well be a source of direct current. Connected across the terminals of this source is an impedance R, which, as here shown, is a resistance. The reference character $L^1$ designates a glow tube having a fixed break-down voltage, which tube may, for example, be a Neon glow lamp. One terminal of the tube $L^1$ is connected with one point on the resistance R, such for example, as one terminal A of this resistance; the other terminal of the tube $L^1$ may be adjustably connected with any point C on the resistance R, and for this purpose the resistance may conveniently be the resistance element of a potentiometer.

In order to operate the apparatus, the point C is moved to the right along the resistance R until the tube $L^1$ begins to glow. By a suitable calibration curve the voltage of the source G may be determined by reading the position of point C when the tube $L^1$ begins to glow.

Referring now to Fig. 2, I will assume that the voltage of the source G may be regulated, and that it is desired to keep this voltage within certain limiting values. Tube $L^1$ is connected across points A and C on the resistance R, which points are so chosen that the tube will glow when the voltage of the source G is equal to or above the desired value, and will become dark when the voltage drops below such value. A second similar tube $L^2$ is connected between two points D and C on the resistance R, which points are so chosen that the tube will be dark when the voltage of the source has the desired value, and will glow when the voltage rises a given amount above such value. It will be seen, therefore, that when the tube $L^1$ becomes dark, the voltage of the source G should be increased, and that when the tube $L^2$ glows, the voltage of the source G should be decreased.

When alternating current is used, the voltages determined by the tube $L^1$ in Fig. 1, and by the tubes $L^1$ and $L^2$ in Fig. 2, are, of course, peak voltages.

Referring now to Fig. 3, the reference character G designates a source of direct current the voltage of which may be regulated, and which voltage is to be kept within the limits of a certain fixed range. The resistance R is connected across the terminals of this source as before, and a glow tube $L^1$ is connected across points A and C through the normal contact of a push button P. The second tube $L^2$ is constantly connected across points A and D of resistance R, and is also connected across points A and B of this resistance through a reverse contact on the push button P. The characteristics of the tubes and the locations of the points B and C are such that the break-down points and the break-off points of these tubes occur at the voltages indicated in Fig. 4.

The operation of the apparatus shown in Fig. 3 is as follows, reference also being had to the curve illustrated in Fig. 4. Assuming that the voltage of the generator G starts at zero and begins to build up, the push button P will be periodically reversed and restored to normal, and when this voltage reaches a value considerably less than the lower control limit, lamp L² will be caused to glow during a reversal of the push button P, but will break off as soon as the push button P is restored to normal because the voltage across points A and D will be less than the break-off voltage. When the voltage of the source reaches the lower control limit, indicated at 2 on the curve, lamp L² will not break off upon restoration of the push button P, that is to say, this lamp will continue to glow. The operation of the push button P may then be discontinued, leaving its normal or upper contact closed. When the voltage reaches the breakdown value of tube L¹, indicated at 3 in the curve, tube L¹ will begin to glow, and the operator will then reduce the voltage of the source and will at the same time periodically operate the push button P. When the voltage is again reduced to slightly below the upper control limit, point 4 on the curve, tube L¹ will stop glowing upon restoration of the push button to its normal position. If now the voltage drops below the lower control limit, point 5 on the curve, tube L² will break off, that is, will stop glowing, whereupon the operator will increase the voltage delivered by the source G, and will periodically operate the push button P. When point 6 is reached, that is, when the voltage again rises above the lower control limit, tube L² will continue to glow when the push button P is restored to the normal position, so that the operator will be aware that the voltage is again within the desired limits.

The apparatus shown in Fig. 3 permits of holding the voltage within the desired limits independently of the large spread between the break-down and the break-off voltages of a glow tube. This apparatus is not necessary when the source is alternating in character, because the breakdown points of the tubes can be used for both of the control limits, the tubes being extinguished each time the voltage passes through zero. In other words, the apparatus shown in Fig. 2 will accomplish the same results with alternating current as will the apparatus shown in Fig. 3 with direct current.

Obviously, the apparatus shown in Fig. 3 could be made to indicate continuously by having the function of the push button performed by a motor-driven device. Similar continuous indication on direct current could be obtained by the apparatus shown in Fig. 3 with an interrupter in the circuit of the common connection of both tubes to the resistance R.

Although I have herein shown and described only three forms of apparatus embodying my invention, it is understood that various changes and modifications may be made therein within the scope of the appended claim without departing from the spirit and scope of my invention.

Having thus described my invention, what I claim is:

In combination, a source of direct current the voltage of which is to be kept within a desired range, a resistance connected across said source, a glow tube normally connected across a given portion of said resistance, a second glow tube connected across a lesser portion of said resistance, and means for at times breaking the circuit through said first tube and connecting the second tube across a much larger portion of said resistance than before, the parts being so chosen and connected that the first tube will break down when the voltage of said source reaches the upper limit of the desired range, and that the second tube will break off when the voltage of said source reaches the lower limit of the desired range.

PAUL H. CRAGO.